United States Patent
Hatch

[15] 3,636,308
[45] Jan. 18, 1972

[54] APPARATUS FOR RECONSTITUTING FROZEN FOOD

[72] Inventor: Kenneth G. Hatch, Milwaukee, Wis.
[73] Assignee: Hatco Corporation, Milwaukee, Wis.
[22] Filed: Apr. 9, 1970
[21] Appl. No.: 26,907

[52] U.S. Cl. ................................................ 219/439
[51] Int. Cl. ........................................... B01j 11/74
[58] Field of Search ............................. 219/400, 439

[56] References Cited

UNITED STATES PATENTS

| 1,512,482 | 10/1924 | Patterson | 219/400 X |
| 2,025,515 | 12/1935 | Jones | 219/400 |
| 3,291,965 | 12/1966 | Hatch | 219/314 |

FOREIGN PATENTS OR APPLICATIONS

| 820,555 | 9/1959 | Great Britain | 219/439 |

Primary Examiner—R. F. Staubly
Attorney—Wheeler, House & Wheeler

[57] ABSTRACT

To thaw and cook frozen food the food is placed on a supporting baffle in a container in which it is completely immersed in water or other cooking liquid and the liquid is caused to circulate rapidly through all parts of the food for uniform heating at an accelerated rate of heat exchange. Rapidity of circulation is achieved by heating the water in one part of a closed circuit and directing it by baffles.

4 Claims, 2 Drawing Figures

INVENTOR
KENNETH G. HATCH

BY Wheeler, Wheeler, House & Clemency
ATTORNEYS 3,636,308

APPARATUS FOR RECONSTITUTING FROZEN FOOD

BACKGROUND OF INVENTION

The food service industry has, for a considerable period of time, been searching for an acceptable way of thawing and cooking frozen food. Attempts merely to heat water in which the food is immersed have failed of their objective because of localized currents which cause some of the food to be heated more rapidly than other portions thereof. Moreover the rate of heat exchange has been relatively slow.

SUMMARY OF INVENTION

It has been found that the heater illustrated in my previous U.S. Pat. No. 3,291,965 (and previously connected with a dishwashing sink) accomplishes perfectly the reconstitution of foods to meet the requirements of the food service industry provided that a special false bottom is used in the sink in conjunction with baffles so located as to produce very rapid gravity circulation throughout the heater and the foods immersed in the liquid in the sink or other container.

A baffle transversely of the receptacle beneath the false bottom prevents short circuiting of the flow between the inlet pipe and the pipe through which the flow is recirculated to the heater. The circulation is improved in the area of the control sensing device with special openings through the false bottom provided in registry with the return flow pipe. By means of these openings, the circulation was made to start rapidly and to continue at an accelerated rate. Other openings through the false bottom of the food receptacle assure uniformity of heating of the food.

DETAILED DESCRIPTION

Figure 1:
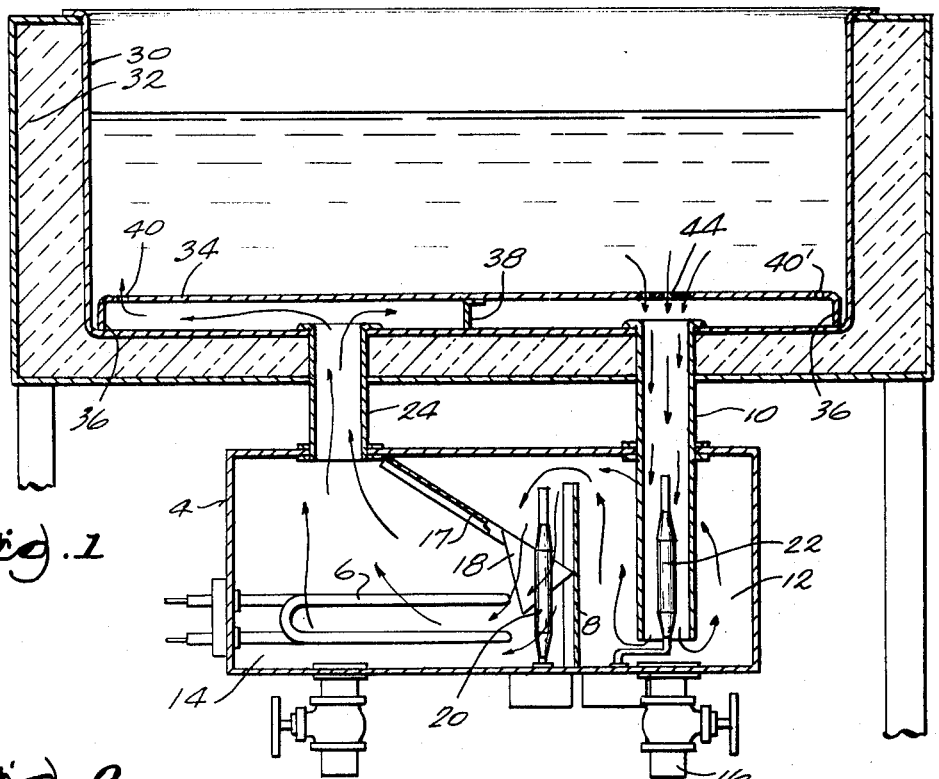
FIG. 1 is a view in cross section through apparatus embodying the invention.

The heating liquid is frequently water although it is contemplated that any other liquid, compatible with the food, may be used. Higher temperature may be achieved if the liquid is brine or cooking oil when appropriate.

The heating tank 4 is substantially as shown in my U.S. Pat. No. 3,291,965 and contains the heating element 6 and a baffle 8 which is in the nature of a dam. There is a pipe 10 for the return of the circulating liquid, such pipe having its lower end spaced above the bottom of tank 4. The baffle 8 divides the tank into a waste-trapping compartment 12 and a heating compartment 14. The compartment 12 is provided with a valve-controlled drain 16. There is preferably an inclined baffle 17 with its corner 18 folded down to guide the incoming liquid past the cutoff thermostat 20. The control thermostat 22 is located inside of the pipe 10 and through appropriate connections it controls the heating element or elements 6 as described in the aforesaid patent.

It is immaterial to the present invention what type of thermostat is used. However, it is desirable that sensors in different positions or at various levels be included to prevent stratification.

Aside from the pipe 10 for incoming circulation and the pipe 24 for outgoing circulation, the tank 4 is completely closed in use.

Pipes 10 and 24 communicate with a treatment container 30 which is optionally provided with insulation 32. An important feature of the present invention consists in the placement in container 30 of a food-supporting baffle 34 which covers almost the entire inner surface of the bottom of tank 30. It may have its marginal flanges turned down as indicated at 36. The baffle is supported on these flanges and on a transverse partition baffle 38 which extends completely or nearly completely across the tank 30 to prevent short circuiting flow between pipes 24 and 10. In rows spaced well within all sides of tank 30, the baffle 34 is provided with openings 40 and 40'.

Figure 2:
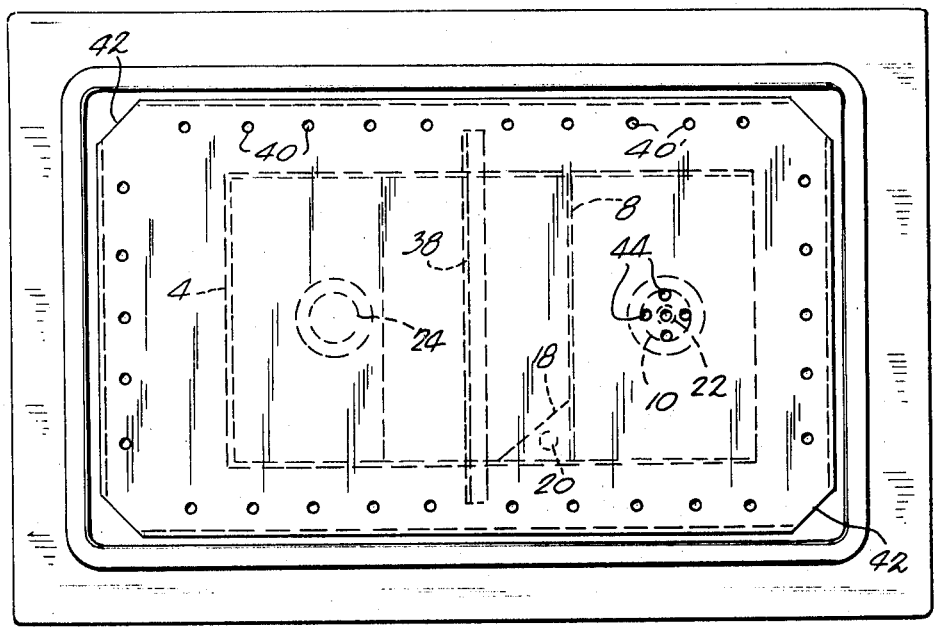
FIG. 2 is a plan view of the false bottom.

Through the openings 40, the heat transfer liquid circulating from the heating reservoir 14 passes upwardly through the false bottom 34. Through the openings 40' the liquid which has traversed the food returns through the false bottom 34 en route to the return circulating pipe 10. Additional communication between the portions of the container 30 which are above and below the false bottom 34 may optionally be provided by cutting away the corners of the false bottom as shown in FIG. 2 at 42.

It was determined experimentally that the circulation of liquid through food packed into container 30 and supported on the false bottom 34 would be sluggish in the area of the control sensing element but for the provision of ports 44 which are placed in the false bottom immediately over the return pipe 10. The liquid cooled by contact with the food passes through the openings 44 into the return pipe 10 and therefore sets up immediately a rapid circulation through the heater and the treatment container 30. The provision of these ports makes a spectacular difference in the time required for reconstituting the food.

Despite the fact that the treatment container 30 is packed directly or in a suitable basket or baskets with vegetables or other foods to be reconstituted, the arrangement described establishes a very rapid flow of liquid uniformly across the food items and back into the heater. It is well known that heat exchange is promoted by rapidity of movement of the heating fluid with respect to the article to be heated. By means of the arrangement disclosed, the desired rapidity of circulation and consequent uniformity of heating and enhancement of heat exchange is achieved with no mechanical moving parts. However, the rate of heat transfer may be increased by the addition of a mechanical pump (not shown).

While the treatment chamber is open with or without a cover to receive food to be treated, the liquid will be cooled by contact with the food in the treatment chamber, and the cooler liquid will pass rapidly through pipe 10 back to the heating chamber.

It is found that both because of the path of movement prescribed by the apertures in the false bottom and also because of the enhanced rapidity of liquid circulation all of the food becomes reconstituted at substantially the same rate throughout the treating chamber 30.

I claim:

1. Food-reconstituting apparatus which comprises a heating chamber having incoming and outgoing pipes, a treatment chamber with which such pipes communicate, a heating liquid substantially completely filling the heating chamber and at least partially filling the treatment chamber, and a false bottom in the treatment chamber between said pipes a baffle substantially precluding short circuiting of flow between said pipes, said false bottom having apertures spaced from the walls of the treatment chamber.

2. Apparatus according to claim 1 in which said apertures are in rows spaced from the center of the false bottom.

3. Apparatus according to claim 2 in which said false bottom has at least one aperture directly over the pipe through which return circulation passes to the heating chamber.

4. Food-reconstituting apparatus which comprises a heating chamber provided in its upper portion with liquid incoming and outgoing pipes, said heating chamber being otherwise closed, a treatment chamber having its top open to receive food to be reconstituted and having a lower portion with which such pipes communicate for circulation of heating liquid, a sufficient quantity of heating liquid in said apparatus substantially to fill the heating chamber and substantially to immerse food placed in the treatment chamber to be reconstituted, a false bottom in the treatment chamber having apertures spaced from the walls of the treatment chamber, said false bottom extending across the incoming pipe through which said liquid reaches the treatment chamber from the heating chamber, a baffle extending transversely across the treatment chamber beneath said false bottom for obstructing the short circuiting of flow of heating liquid between said pipes, said false bottom having flow-distributing openings for liquid rising from the incoming pipe and for liquid which has traversed the food in the treatment chamber and is returning to the outgoing pipe, at least one opening in the false bottom being in substantial registry with the outgoing pipe for accelerating flow from the treatment chamber to the heating chamber.

* * * * *

UNITED STATES PATENT OFFICE
CERTIFICATE OF CORRECTION

Patent No. 3,636,308          Dated January 18, 1972

Inventor(s)  Kenneth G. Hatch

It is certified that error appears in the above-identified patent and that said Letters Patent are hereby corrected as shown below:

Column 2, Line 49, insert _having_ before the word - between -

Signed and sealed this 13th day of June 1972.

(SEAL)
Attest:

EDWARD M. FLETCHER, JR.                ROBERT GOTTSCHALK
Attesting Officer                      Commissioner of Patents